(12) United States Patent
Barna

(10) Patent No.: US 9,701,180 B2
(45) Date of Patent: Jul. 11, 2017

(54) EXTENDABLE SUN VISOR ASSEMBLY

(71) Applicant: Georghe Barna, Garden City, MI (US)

(72) Inventor: Georghe Barna, Garden City, MI (US)

( * ) Notice: Subject to any disclaimer, the term of this patent is extended or adjusted under 35 U.S.C. 154(b) by 0 days.

(21) Appl. No.: 15/149,895

(22) Filed: May 9, 2016

(65) Prior Publication Data

US 2016/0250910 A1 Sep. 1, 2016

Related U.S. Application Data

(63) Continuation-in-part of application No. 14/340,797, filed on Jul. 25, 2014, now Pat. No. 9,352,638.

(51) Int. Cl.
*B60J 3/02* (2006.01)
*G03G 15/08* (2006.01)
*B60J 1/20* (2006.01)

(52) U.S. Cl.
CPC ........ *B60J 3/0208* (2013.01); *G03G 15/0863* (2013.01); *G03G 15/0865* (2013.01); *G03G 15/0868* (2013.01); *G03G 15/0872* (2013.01); *G03G 15/0875* (2013.01); *G03G 15/0886* (2013.01); *B60J 1/2063* (2013.01); *B60J 1/2077* (2013.01); *B60J 3/02* (2013.01); *B60J 3/0204* (2013.01); *G03G 2215/067* (2013.01); *G03G 2215/0668* (2013.01)

(58) Field of Classification Search
CPC ..................................................... B60J 3/0208
USPC .................................. 296/97.8, 97, 9, 97.12
See application file for complete search history.

(56) References Cited

U.S. PATENT DOCUMENTS

| | | | | |
|---|---|---|---|---|
| 2,501,371 | A * | 3/1950 | Apelt ..................... | B60J 3/0204 160/239 |
| 5,133,585 | A * | 7/1992 | Hassan ..................... | B60J 3/02 160/370.22 |
| 5,156,434 | A * | 10/1992 | Vandagriff ............. | B60J 3/0208 296/97.12 |
| 5,711,570 | A * | 1/1998 | Wu ........................ | B60J 3/0208 296/97.8 |
| 5,842,748 | A * | 12/1998 | Cummins .............. | B60J 3/0208 296/97.2 |
| D431,805 | S * | 10/2000 | Baltazar ....................... | D12/191 |
| 6,139,084 | A * | 10/2000 | Miles ..................... | B60J 3/0208 296/97.6 |
| RE37,068 | E | 2/2001 | Beatty | |
| 6,565,140 | B2 * | 5/2003 | Wells ..................... | B60J 3/0208 296/97.2 |
| D524,206 | S * | 7/2006 | Hohney ....................... | D12/191 |
| 8,246,099 | B2 | 8/2012 | Lee | |
| 8,789,870 | B1 * | 7/2014 | Tolbert .................. | B60J 3/0208 296/97.8 |
| 9,233,598 | B1 * | 1/2016 | Elwood .................. | B60J 3/0217 |
| 2009/0058125 | A1 | 3/2009 | Mac | |
| 2009/0152891 | A1 * | 6/2009 | Lee ........................ | B60J 3/0208 296/97.4 |
| 2012/0133173 | A1 * | 5/2012 | Watase .................. | B60J 3/0208 296/97.8 |

(Continued)

*Primary Examiner* — Clayton E LaBalle
*Assistant Examiner* — Kevin Butler

(57) ABSTRACT

An extendable sun visor assembly shades the eyes of drivers and passengers from the glare of light while in a vehicle. The assembly includes a housing. A mounting apparatus is coupled to the housing and is configured for mounting the housing to an interior surface of a vehicle adjacent a selectable window of the vehicle. An extension is extendably coupled to the housing.

9 Claims, 5 Drawing Sheets

(56) References Cited

U.S. PATENT DOCUMENTS

2013/0033059 A1* 2/2013 Liu .................. B60J 3/0208
  296/97.2
2016/0023541 A1* 1/2016 Barna ............... B60J 3/0208
  296/97.2

* cited by examiner

EXTENDABLE SUN VISOR ASSEMBLY

BACKGROUND OF THE DISCLOSURE

Field of the Disclosure

The disclosure relates to sun visor assemblies and more particularly pertains to a new sun visor assembly for shading the eyes of drivers and passengers from the glare of light while in a vehicle.

SUMMARY OF THE DISCLOSURE

An embodiment of the disclosure meets the needs presented above by generally comprising a housing. A mounting apparatus is coupled to the housing and is configured for mounting the housing to an interior surface of a vehicle adjacent a selectable window of the vehicle. An extension is extendably coupled to the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
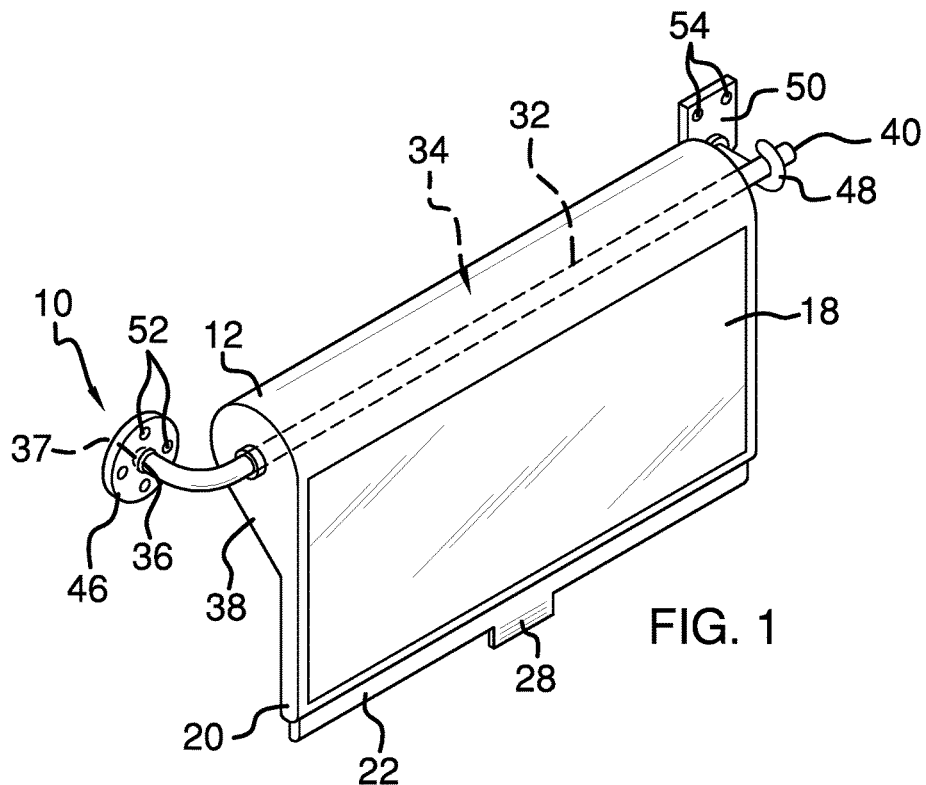
FIG. 1 is a top front side perspective view of an extendable sun visor assembly according to an embodiment of the disclosure.
Figure 2:
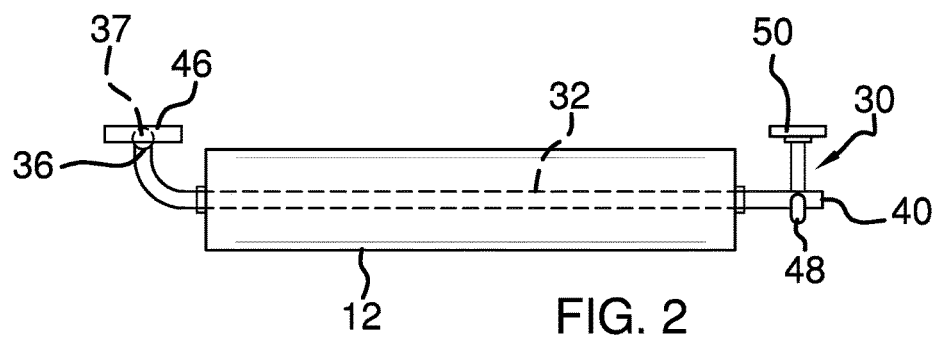
FIG. 2 is a top view of an embodiment of the disclosure.
Figure 3:
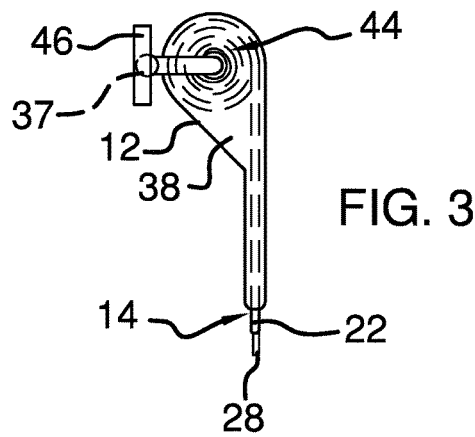
FIG. 3 is a side view of an embodiment of the disclosure showing the panel retracted into the housing
Figure 4:
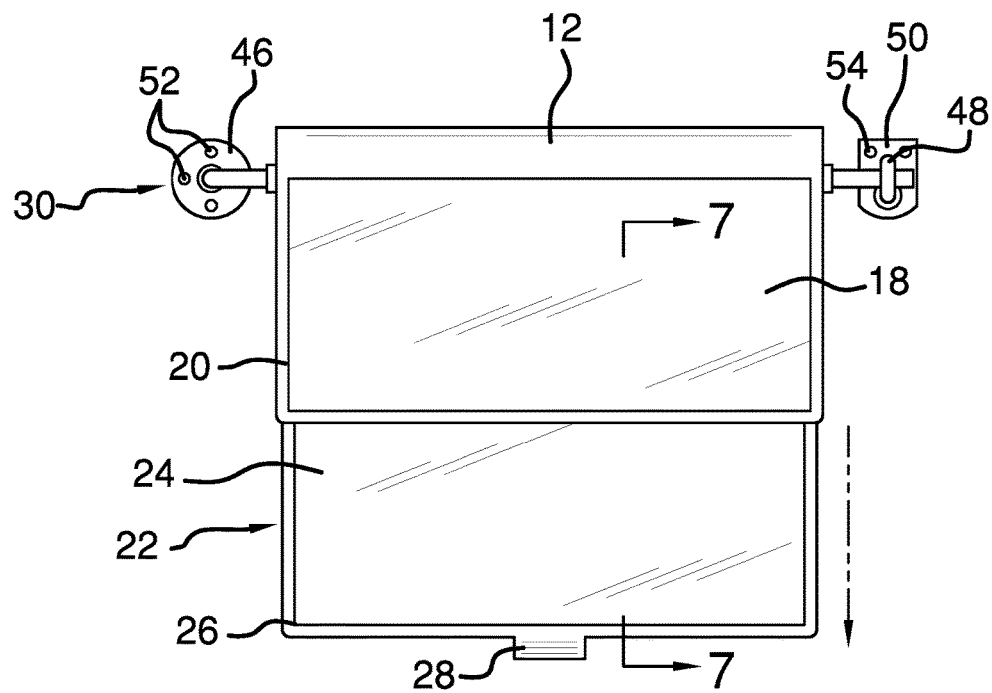
FIG. 4 is a front view of an embodiment of the disclosure.
Figure 5:
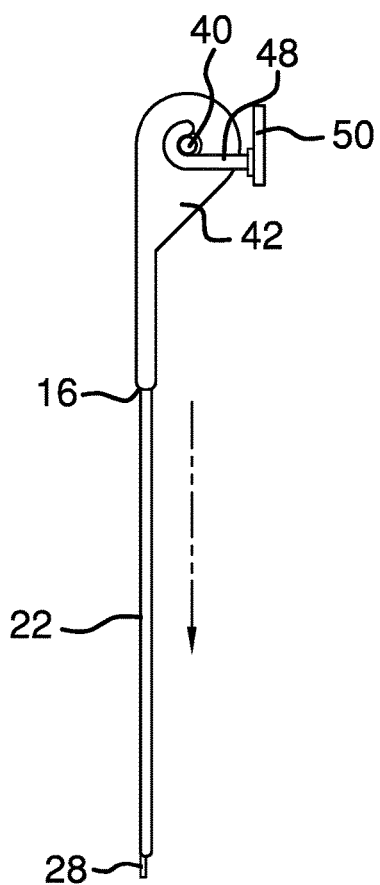
FIG. 5 is a side view of an embodiment of the disclosure showing the panel extended from the housing.
Figure 6:
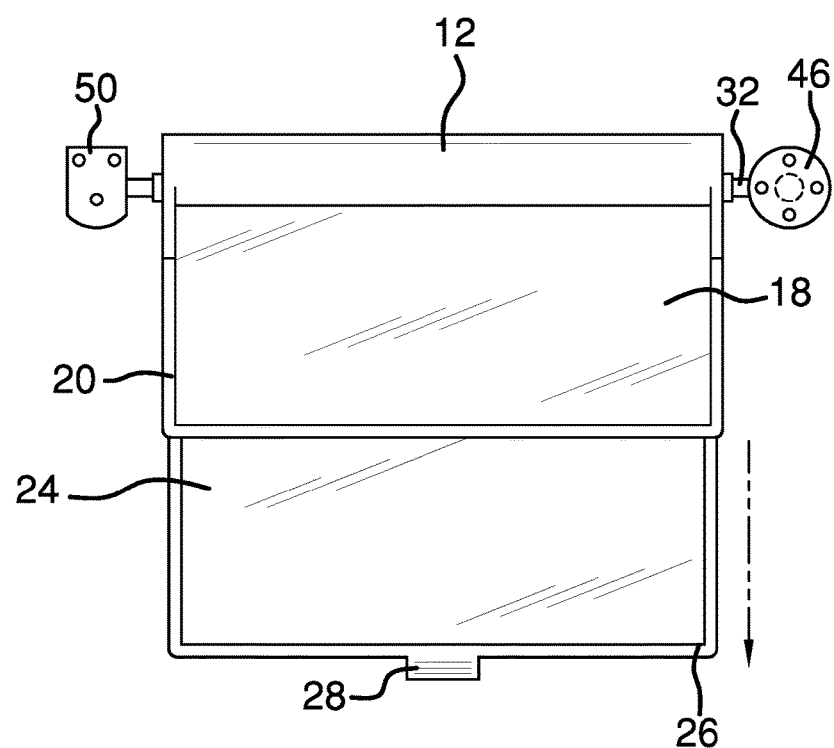
FIG. 6 is a rear view of an embodiment of the disclosure showing the panel extended from the housing.
Figure 7:
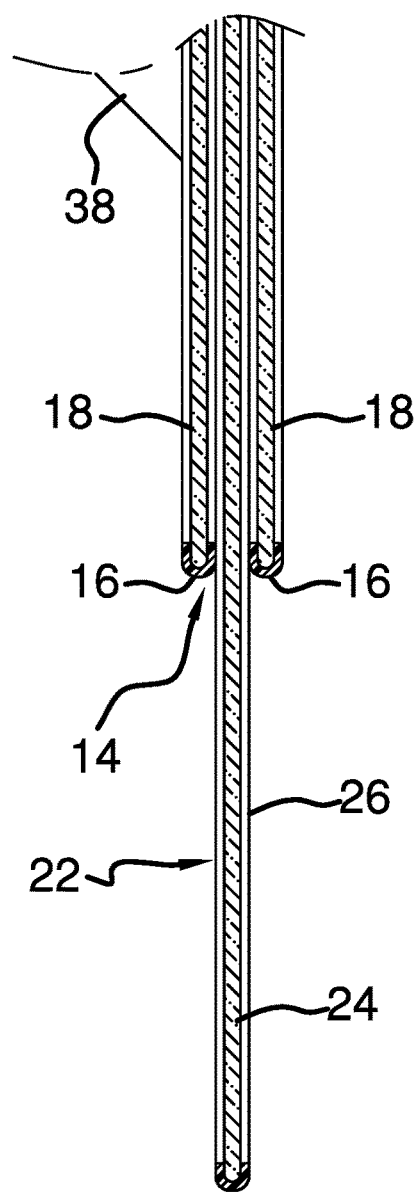
FIG. 7 is a cross-sectional view of an embodiment of the disclosure taken along line 7-7 of FIG. 4.

With reference now to the drawings, and in particular to FIGS. 1 through 7 thereof, a new sun visor assembly embodying the principles and concepts of an embodiment of the disclosure and generally designated by the reference numeral 10 will be described.

As best illustrated in FIGS. 1 through 7, the extendable sun visor assembly 10 generally comprises a housing 12 having a slot 14 extending therein. The slot 14 is positioned in a bottom edge 16 of the housing 12. The housing 12 may include a housing window 18 and a housing frame 20. The housing frame 20 is comprised of a rigid material, such as plastic or the like. The housing frame 20 is coupled to and extends around the housing window 18. The housing window 18 is constructed from a polarized non-glare material to selectively block unwanted light. More particularly, the housing window 18 may be constructed from a synthetic plastic sheet used as a polarizing filter and sold under the trademark Polaroid. Alternatively, the housing window 18 may be constructed from a translucent or tinted transparent material to provide either partial screening of light or some visibility looking through the housing window 18. The housing 12 may have rounded corners to protect against injury to a user should the user get into an automobile accident.

An extension 22 is extendably coupled to the housing 12. The extension 22 is retractable from the housing 12 through the slot 14. The extension 22 may include an extension window 24 and an extension frame 26. The extension frame 26 is comprised of a rigid material, such as plastic or the like. The extension frame 26 is coupled to and extends around the extension window 24. The extension window 24 is constructed from a polarized non-glare material, such as Polaroid or the like, to selectively block unwanted light. Alternatively, the extension window 24 may be constructed from a translucent or tinted transparent material to provide either partial screening of light or some visibility looking through the extension window 24. A tab 28 may be integrally coupled to the extension 22 to facilitate pulling the extension 22 downwardly out of the slot 14. The tab 28 is positioned outside of the housing 12 when the extension 22 is fully inserted into the housing 12. The extension 22, similar to the housing 12, may have rounded corners to protect the user against injury.

A mounting apparatus 30 is coupled to the housing 12 and is configured for mounting the housing 12 to an interior surface of a vehicle just above the windshield. The mounting apparatus 30 includes a rod 32 extending through an interior space 34 of the housing 12. The extension 22 is rotatably mountable around the rod 32. The rod 32 has a first end 36 extending outwardly of a first lateral side 38 of the housing 12 and a second end 40 extending outwardly of a second lateral side 42 of the housing 12. A biasing member 44 is mounted within the housing 12 and is mechanically coupled to the extension 22 wherein the biasing member 44 automatically retracts the extension 22 into the housing 12. The mounting apparatus 30 further includes a mount 46, a hook 48 and a bracket 50. The mount 46 may have holes 52 positioned therein and the bracket 54 may have apertures 54 positioned therein for fastening each of the mount 46 and the bracket 54 to the interior surface of the vehicle just above the windshield using screws or the like. The mount 46 and the bracket 50 are spaced apart and aligned relative to each other when each is mounted to the interior surface of the vehicle. The first end 36 of the rod 32 is coupled to the mount 46 and may be pivotally coupled to the mount 46 via a ball joint 37 or the like to allow the housing 12 and the extension 22 to pivot between the windshield and a front side window of the vehicle. The rod 32 is supportable by the hook 48 adjacent to the second end 40 of the rod 32. The hook 48 is coupled to and extends outwardly from the bracket 50.

In use, the housing 12 is mounted to the interior surface of a vehicle adjacent a selectable window the vehicle using the mounting apparatus 30. The housing 12 can be positioned in front of the windshield or can be pivoted in front of a front side window of the vehicle like a conventional sun visor. When desired, the extension 22 is pulled downwardly out of the housing 12 using tab 28 in order to selectively block unwanted light and reduce glare for either a passenger or driver of the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extendable sun visor assembly comprising:
   a housing;
   a mounting apparatus coupled to said housing and being configured for mounting said housing to an interior surface of a vehicle adjacent a selectable window of the vehicle;
   an extension extendably coupled to said housing;
   wherein said mounting apparatus includes a rod extending through an interior space of said housing, an upper portion of said extension being mounted around said rod, said rod having a first end extending outwardly of a first lateral side of said housing, said mounting apparatus further including a mount, said first end of said rod being coupled to said mount, said rod being pivotally coupled to said mount;
   a biasing member mounted within said housing and being mechanically coupled to said extension wherein said biasing member automatically retracts said extension into said housing by wrapping of said upper portion around said rod as said extension is retracted; and
   wherein said mounting apparatus further includes a hook coupled to and extending outwardly from a bracket, said rod having a second end extending outwardly of a second lateral side of said housing, said rod being supportable by said hook adjacent to said second end of said rod.

2. The assembly of claim 1, further comprising said housing having a slot extending therein, said extension being retractable from said slot.

3. The assembly of claim 2, further comprising said slot being positioned in a bottom edge of said housing.

4. The assembly of claim 1, further comprising wherein said extension includes an extension window and an extension frame, said extension frame being coupled to and extending around said extension window.

5. The assembly of claim 1, further comprising a tab integrally coupled to said extension, said tab being positioned outside of said housing when said extension is fully inserted into said housing.

6. The assembly of claim 4, further comprising wherein said extension window is constructed of a polarized non-glare material.

7. The assembly of claim 1, further comprising wherein said housing includes a housing window and a housing frame, said housing frame being coupled to and extending around said housing window.

8. The assembly of claim 7, further comprising wherein said housing window is constructed of a polarized non-glare material.

9. The assembly of claim 1, further comprising:
   said mount having holes positioned therein;
   said bracket having apertures positioned therein; and
   each of said holes and said bracket being configured to receive a fastener therethrough.

\* \* \* \* \*

UNITED STATES PATENT AND TRADEMARK OFFICE
CERTIFICATE OF CORRECTION

Page 1 of 1

PATENT NO. : 9,701,180 B2
APPLICATION NO. : 15/149895
DATED : July 11, 2017
INVENTOR(S) : Gheorghe Barna It is certified that error appears in the above-identified patent and that said Letters Patent is hereby corrected as shown below:

On the Title Page

Item (71) Applicant and Item (72) Inventor should read:
Gheorghe Barna

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*